United States Patent [19]

Kawasaki et al.

[11] 3,755,275

[45] Aug. 28, 1973

[54] PROCESS FOR PREPARING AN ALTERNATE COPOLYMER OF BUTADIENE AND ACRYLONITRILE

[75] Inventors: Akihiro Kawasaki; Masanobu Taniguchi; Tsuneto Nishiyama, all of Ichihara-shi; Hiroaki Ueda, Chiba-shi, all of Japan

[73] Assignee: Maruzen Petrochemical Co., Tokyo, Japan

[22] Filed: Aug. 27, 1969

[21] Appl. No.: 853,499

[30] Foreign Application Priority Data

Sept. 5, 1968 Japan.............................. 43/63383
Sept. 5, 1968 Japan.............................. 43/63385
Dec. 10, 1968 Japan.............................. 43/89975
Dec. 26, 1968 Japan.............................. 43/94935

[52] U.S. Cl.............................. 260/82.5, 260/82.3
[51] Int. Cl. ........................... C08d 1/4, C08d 3/02
[58] Field of Search.................................. 260/82.5

[56] References Cited
OTHER PUBLICATIONS

Symposium of Japanese Chemical Fibers Institute, October, 1968, No. 26, p. 83–96, Furakawa et al.

*Primary Examiner*—Joseph L. Schofer
*Assistant Examiner*—William F. Hamrock
*Attorney*—Flynn & Frishauf

[57] ABSTRACT

A new process for preparing an alternate copolymer of butadiene and acrylonitrile by contacting butadiene with acrylonitrile in liquid phase in the presence of the catalyst system comprising aluminum chloride, stannic chloride or zinc chloride as the first component, a vanadium compound or a chromium compound as the second component, and an organic peroxide as the third component.

10 Claims, No Drawings

PROCESS FOR PREPARING AN ALTERNATE COPOLYMER OF BUTADIENE AND ACRYLONITRILE

BACKGROUND OF THE INVENTION

1. Field of the Invention

This invention relates to a new process for copolymerizing butadiene and acrylonitrile and more particularly to a new process for preparing an alternate copolymer of butadiene and acrylonitrile which shows high elasticity. The alternate copolymer of this invention is useful in the fields of polymer, rubber and plastic industries, etc. The alternate copolymer of this invention is easily soluble in some kinds of organic solvents. It shows high rubber-like elasticity than the corresponding random copolymer of butadiene and acrylonitrile. Its glass transition temperature is lower than that of the conventional random copolymer.

2. Description of prior art

As far as the inventors know, there is no prior art in connection with the process of preparing an alternate copolymer of butadiene and acrylonitrile.

DESCRIPTION OF THE INVENTION

This invention is based on the discovery that by using a catalyst system comprising aluminum chloride as the first component, a vanadium compound or a chromium compound as the second component and an organic peroxide as the third component, acrylonitrile can be copolymerized with butadiene to produce a high molecular weight alternate copolymer. The detailed physical data are given in the copending application Ser. No. 836,736 filed June 26, 1969 now U. S. Pat. No. 3,658,775.

The composition of the copolymer according to elementary analysis substantially agrees with the calculated value for the 1:1 copolymer of butadiene and acrylonitrile. The copolymerization reaction gave 1:1 copolymer over a wide range of initial monomer compositions and also independently of polymerization time. The microstructure of butadiene unit in the copolymer was all trans-configuration. The NMR spectrum of the copolymer was shown to be very different from that of the conventional ultra high nitrile random copolymer of butadiene and acrylonitrile prepared by the prior art. Two strong peaks were observed at 7.71 $\tau$ and 7.89 $\tau$ in the NMR spectrum of the conventional ultra high nitrile random copolymer. On the other hand in the NMR spectrum of the 1:1 copolymer in this invention only one strong peak appears at 7.71 $\tau$ in this region. This means that block sequence of butadiene-butadiene is not substantially included in the copolymer of this invention. Consequently, each fact mentioned above supports the assumption that the present copolymer is an alternate copolymer of butadiene and acrylonitrile.

The alternate copolymer is easily soluble in chloroform, acetone and dimethylformamide at room temperature. This new alternate copolymer has many advantageous properties. For example, it shows higher rubbery elasticity than the conventional ultra high nitrile random copolymer and its glass transition temperature is lower than that of the conventional random copolymer. The microstructure of butadiene unit in the conventional ultra high nitrile random copolymer is substantially trans- and 1.2-configurations. On the other hand, as described above, the microstructure of butadiene unit in this alternate copolymer is all transconfiguration.

Through the inventors study, the catalyst system formed from aluminum chloride and organic peroxide was also found to produce a 1:1 copolymer of butadiene and acrylonitrile. However, most of the copolymer was only sparingly soluble in usual organic solvents. Therefore, the copolymer was very difficult to process. The IR spectrum of the chloroform soluble fraction of the copolymer was quite similar to that of the chloroform insoluble fraction and the microstructure of butadiene unit of the copolymer was all trans 1.4-configuration. The NMR spectrum of the chloroform soluble fraction showed no peak at 7.89$\rho$ which would arise from the butadiene-butadiene sequence but showed a strong single peak at 7.71$\tau$ which would arise from the butadiene-acrylonitrile sequence. From the above results the copolymer was determined to be an alternate copolymer of butadiene and acrylonitrile. However, as described above, most of the copolymer is only sparingly soluble in the usual organic solvents.

On the other hand, the inventors also found that a two component catalyst system composed of stannic chloride and an organic peroxide or of zinc chloride and an organic peroxide was also found to produce copolymer of butadiene and acrylonitrile. However, the acrylonitrile/butadiene molar ratio of the copolymer was always lower than 1. Moreover most of the copolymer was only sparingly soluble in usual organic solvents. The chloroform soluble fraction of the copolymer contained a much higher content of the butadiene-acrylonitrile repeating unit than did a random copolymer. The fraction showed a considerable amount of 7.89$\tau$ peak in the NMR spectrum but still less than found in a random copolymer. While the copolymer contained butadiene unit prevalent in the trans 1.4-configuration, some butadiene units had the 1.2-configuration. As described above, most of the copolymer is only sparingly soluble in usual organic solvents and therefore the copolymer is not suitable for commercial use.

The detailed physical data are given in said copending application Ser. No. 836,736.

From the above results, it was found that by adding a vanadium or a chromium compound to the aluminum chloride-organic peroxide, stannic chloride-organic peroxide or zinc chloride-organic peroxide catalyst systems, an organic solvent soluble alternate copolymer of butadiene and acrylonitrile could be obtained, and, thus, this invention was completed.

The vanadium compound forming one component of the catalyst system of this invention is selected from any one having the formula OVCl$_{3-n}$(OR)$_n$ wherein $n$ is a number from 0 to 3 and R is an alkyl, aryl or cycloalkyl group and a vanadium complex, for example, bis(cyclopentadienyl) vanadium, bis(cyclopentadienyl) vanadium chloride, bis(cyclopentadienyl)-vanadium dichloride, cyclopendadienylvanadium trichloride, cyclopentadienylvanadium dichloride oxide, tetracarbonyl cyclopentadienylvanadium, acetylacetonyl-vanadium dichloride oxide, triacetylacetonyl-vanadium oxide, diacetylacetonylvanadium chloride oxide, diacetylacetonylvanadium oxide, triacetylacetonylvanadium, etc. Chromium (VI) oxychloride is used as the chromium compound. Organic peroxides usable in this invention include alkyl peroxides, for example, tert-butyl peroxide, acyl peroxides, for example, benzoyl peroxide, and hydroperoxides, for example, cumene hydroperoxide.

Hydrocarbons, such as heptane, octane, isooctane, benzene, toluene, etc., chlorinated, hydrocarbons, such as methylene chloride, ethylene chloride, tetrachloroethane, tetrachloroethylene, ethylchloride, trichloroethylene, trichloroethane, etc., or a mixture of such solvents are used as diluent in preparing the catalyst.

Preparation of the alternate copolymer of butadiene and acrylonitrile is carried out by contacting butadiene with acrylonitrile in liquid phase in the presence of the three-component catalyst system described above.

The copolymerization reaction is generally carried out in the presence of a liquid organic diluent. Suitable diluents that can be used for the copolymerization are hydrocarbons, such as heptane, octane, isooctane, benzene, toluene, etc; chlorinated hydrocarbons, such as methylene chloride, ethylene chloride tetrachloroethane, tetrachloroethylene, ethylchloride, trichloroethylene, trichloroethane, etc; or a mixture of such diluents.

The temperature of the copolymerization process can be varried over a wide range, generally from $-100°$ C to $+60°$ C and preferably from $-70°$ C to $+40°$ C. Sufficient pressure is employed to keep the monomers in liquid condition regardless whether a diluent is present in the reaction mixture or not.

In general, the molar ratio of butadiene to acrylonitrile in the initial monomer composition will be from 20:80 to 80:20 the preferred ratio being 50:50.

After the polymerization is complete, the reaction product is separated from the reaction tube and treated to separate the diluent and unreacted monomers. The alternate copolymer is then treated to remove the catalyst residue, which treatment may comprise mixing the chloroform solution of the copolymer with an acidified methanol. The acid which is used to acidify methanol is a mineral acid such as hydrochloric acid. Thereafter, the deposited solid copolymer may be washed with methanol several times and may be dried under vacuum. A small amount of butadiene homopolymer may be involved in the reaction product; this is easily removed by washing the reaction product with diethyl ether.

The following examples illustrate the preparation of the alternate copolymer of butadiene and acrylonitrile in accordance with this invention.

EXAMPLE 1

Employing the usual dry air-free technique, 0.5 millimole benzoyl peroxide, 3 milliliters methylene chloride and varying amounts of vanadium (V) oxychloride solution in methylene chloride (1 molar solution) were put successively in a 25 milliliter glass bottle at room temperature. Thereafter, the bottle was held in a low temperature bath at $-78°$ C and 1 millimole of aluminum chloride dissolved in 3.3 milliliters acrylonitrile and 4.0 milliliters liquid butadiene were put successively in the bottle also employing the usual dry air-free technique. Then the bottle was sealed and the monomers therein were allowed to polymerize at $25°$ C for 16 hours. The amount of each individual catalyst component is set forth in Table 1.

TABLE 1

| | Monomers* | | | Catalysts** | | | Reaction conditions | | Copolymer*** | |
|---|---|---|---|---|---|---|---|---|---|---|
| | AN (ml.) | BD (ml.) | CH₂Cl₂ (ml.) | AlCl₃ (mmol) | VOCl₃ (mmol) | B.P.O. (mmol) | Temp. (° C.) | Time (hr.) | Yield (g.) | $[\eta]$ (dl./g.) |
| Exp. No.: | | | | | | | | | | |
| 1 | 3.3 | 4.0 | 3 | 1 | 0.05 | 0.5 | 25 | 16 | 0.52 | |
| 2 | 3.3 | 4.0 | 3 | 1 | 0.20 | 0.5 | 25 | 16 | 0.32 | 0.9 |
| Reference 1 | 3.3 | 4.0 | 3 | 1 | 0 | 0.5 | 25 | 26 | 0.26 | |

* AN: acrylonitrile; BD: liquid butadiene.
** B.P.O.: benzoyl peroxide.
*** $[\eta]$: intrinsic viscosity in chloroform at 30° C.

Reference 1 shows the result obtained by the catalyst system formed by leaving out VOCl₃ from the AlCl₃-B.P.O.-VOCl₃ catalyst system.

All copolymers in Table 1 were determined to be 1:1 copolymers of butadiene and acrylonitrile from their elementary analysis and the microstructures of butadiene unit in these copolymers were found to be all trans 1.4-structure from their IR data. They were also confirmed to be alternate copolymers of butadiene and acrylonitrile from their NMR data showing no $7.9\tau$ peak arising from the methylene groups of butadiene-butadiene sequence. However, the copolymers in Exp. No. 1 and 2 were all easily soluble in chloroform and acetone at room temperature. On the other hand, most of the copolymer in Reference 1 was only sparingly soluble in the usual organic solvents. Therefore, the copolymer of reference 1 is very difficult to process. Moreover, it is observed in Table 1 that by adding VOCl₃ to the AlCl₃-B P.O. catalyst system, yield of the alternate copolymer increases.

EXAMPLE 2

Employing the usual dry air-free technique, 0.5 millimole benzoyl peroxide, 3 milliliters toluene and varying amounts of vanadium (V) oxychloride solution in toluene (1 molar solution) were put successively in a 25 milliliter glass bottle at room temperature. Thereafter, the bottle was held in a low temperature bath at $-78°$ C and 1 millimole of aluminum chloride dissolved in 3.3 milliliters acrylonitrile and 4.0 milliliters liquid butadiene were put successively in the bottle also employing the usual dry air-free technique. Then, the bottle was sealed and the contents allowed to polymerize at $25°$ C for 16 hours. The amount of each individual catalyst component is set forth in Table 2.

TABLE 2

| | Monomers* | | | Catalysts** | | | Reaction conditions | | Copolymer*** | |
|---|---|---|---|---|---|---|---|---|---|---|
| | AN (ml.) | BD (ml.) | Toluene (ml.) | AlCl₃ (mmol) | VOCl₃ (mmol) | B.P.O. (mmol) | Temp. (° C.) | Time (hr.) | Yield (g.) | $[\eta]$ (dl./g.) |
| Exp. No.: | | | | | | | | | | |
| 1 | 3.3 | 4.0 | 3 | 1 | 0.05 | 0.5 | 25 | 16 | 0.32 | |
| 2 | 3.3 | 4.0 | 3 | 1 | 1.00 | 0.5 | 25 | 16 | 0.38 | 1.4 |
| Reference 1 | 3.3 | 4.0 | 3 | 1 | 0 | 0.5 | 25 | 16 | 0.26 | |

* AN: acrylonitrile; BD: liquid butadiene.
** B.P.O.: benzoyl peroxide.
*** $[\eta]$: intrinsic viscosity in chloroform at 30° C.

Reference 1 shows the result obtained by the catalyst system formed by leaving VOCl₃ out of the AlCl₃-B.P.O.-VOCl₃ catalyst system.

All copolymers in Table 2 were determined to be 1:1 copolymers of butadiene and acrylonitrile from their elementary analysis and the microstructures of butadiene unit in these copolymers were found to be all trans 1.4-structure from their IR data. They were also confirmed to be an alternate copolymers of butadiene and acrylonitrile from their NMR data showing no 7.9τ peak arising from methylene groups of butadiene-butadiene sequence. However, most of the copolymers in Exp. No. 1 and 2 were all easily soluble in chloroform and acetone at room temperature. On the other hand the copolymer in Reference 1 was only sparingly soluble in the usual organic solvents. Therefore, the latter copolymer is very difficult to process. Moreover, it is observed in Table 2 that by adding VOCl₃ to the AlCl₃-B.P.O. catalyst system, yield of the alternate copolymer increases.

EXAMPLE 3

Employing the usual dry air-free technique, 0.5 millimole benzoyl peroxide, varying amounts of methylene chloride and varying amounts of vanadium (V) oxychloride solution in methylene chloride (1 molar solution) were put successively in a 25 milliliter glass bottle at room temperature. Thereafter, the bottle was held in a low temperature bath at −78° C and 1 millimole of stannic chloride dissolved in 3.3 milliliters acrylonitrile and 4.0 milliliters liquid butadiene were put successively in the bottle also employing the usual dry air-free technique. Then, the bottle was sealed and the contents allowed to polymerize at 25° C for 16 hours. The amount of each individual catalyst component is set forth in Table 3.

ity of the copolymer was sparingly soluble in usual organic solvents. However, the chloroform soluble fraction of the copolymer contained a much higher content of the butadiene-acrylonitrile repeating unit than did a random copolymer. This fraction showed a considerable amount of the 7.9τ peak in the NMR spectrum but still less than found in a random copolymer. A sharp peak at 8.2τ, which is characteristic of the alternating unit, was also present. While the copolymer contained butadiene unit prevalently in the trans 1.4-structure, some butadiene units had the 1.2-structure.

From above results it is found that by adding VOCl₃ to the SnCl₄-B.P.O. catalyst system, solubility and degree of alternation of the copolymer obtained are both increased.

EXAMPLE 4

Employing the usual dry air-free technique, 2 milliliters methylene chloride, 12.5 millimoles zinc chloride and 1.7 milliliters acrylonitrile were put successively in a 25 milliliter glass bottle at room temperature. Thereafter, the bottle was held in a low temperature bath at −78° C and 0.5 millimole benzoyl peroxide, 1 milliliter vanadium (V) oxychloride solution in methylene chloride (1 molar solution) and 2.0 milliliters liquid butadiene were put successively in the bottle also employing the usual dry air-free technique. Then, the bottle was sealed and the contents allowed to polymerize at 25° C for 17 hours. 0.40g acetone and chloroform soluble alternate copolymer of butadiene and acrylonitrile was obtained. Its intrinsic viscosity was 0.4 (dl/g) in chloroform at 30° C.

EXAMPLE 5

Employing the usual dry air-free technique, 0.5 millimole benzoyl peroxide, 3 milliliters methylene chloride

TABLE 3

| | Monomers* | | Diluent CH₂Cl₂ (ml.) | Catalysts** | | | Reaction conditions | | Copolymer*** | |
|---|---|---|---|---|---|---|---|---|---|---|
| | AN (ml.) | BD (ml.) | | SnCl₄ (mmol) | VOCl₃ (mmol) | B.P.O. (mmol) | Temp. (° C.) | Time (hr.) | Yield (g.) | [η] (dl./g.) |
| Exp. No.: | | | | | | | | | | |
| 1 | 3.3 | 4.0 | 3 | 1 | 0.05 | 0.5 | 25 | 16 | 0.20 | 0.5 |
| 2 | 3.3 | 4.0 | 3 | 1 | 0.20 | 0.5 | 25 | 16 | 0.20 | 0.3 |
| 3 | 3.3 | 4.0 | 2 | 1 | 1.00 | 0.5 | 25 | 16 | 0.54 | 0.6 |
| 4 | 3.3 | 4.0 | 1 | 1 | 2.00 | 0.5 | 25 | 16 | 0.41 | |
| Reference 1 | 3.3 | 4.0 | 3 | 1 | 0 | 0.5 | 25 | 16 | 0.15 | |

\* AN: acrylonitrile; BD: liquid butadiene.
\*\* B.P.O.: benzoyl peroxide.
\*\*\* [η]: intrinsic viscosity in chloroform at 30° C.

Reference 1 shows the result obtained by the catalyst system formed by leaving out VOCl₃ from the SnCl₄-B.P.O.-VOCl₃ catalyst system.

The copolymers in Exp. No. 1 − 4 were all determined to be alternate copolymers of butadiene and acrylonitrile from their NMR data and the microstructures of butadiene unit in these copolymers were found to be all trans 1.4-structure from their I.R. spectra. These alternate copolymers were easily soluble in chloroform and acetone at room temperature.

On the other hand, the copolymer in Reference 1 contained 45 mole percent acrylonitrile and the majorand varying amounts of chromium (VI) oxychloride solution in methylene chloride (1 molar solution) were put successively in a 25 milliliter glass bottle at room temperature. Thereafter, the bottle was held in a low temperature bath at −78° C and 1 millimole of aluminum chloride dissolved in 3.3 milliliters acrylonitrile and 4.0 milliliters liquid butadiene were put successively in the bottle also employing the usual dry air-free technique. Then, the bottle was sealed and the contents allowed to polymerize at 35° C for 16 hours. The amount of each individual catalyst component is set forth in Table 4.

TABLE 4

| | Monomers* | | CH₂Cl₂ (ml.) | Catalysts** | | | Reaction conditions | | Copolymer*** | |
|---|---|---|---|---|---|---|---|---|---|---|
| | AN (ml.) | BD (ml.) | | AlCl₃ (mmol) | CrO₂Cl₂ (mmol) | B.P.O. (mmol) | Temp. (° C.) | Time (hr.) | Yield (g.) | [η] (dl./g.) |
| Exp. No.: | | | | | | | | | | |
| 1 | 3.3 | 4.0 | 3 | 1 | 0.05 | 0.05 | 35 | 16 | 0.78 | |
| 2 | 3.3 | 4.0 | 3 | 1 | 0.50 | 0.05 | 35 | 16 | 0.87 | |
| Reference 1 | 3.3 | 4.0 | 3 | 1 | 0 | 0.05 | 35 | 16 | 0.39 | |

\* AN: acrylonitrile; BD: liquid butadiene.
\*\* B.P.O.: benzoyl peroxide.
\*\*\* [η]: intrinsic viscosity in chloroform at 30° C.

Reference 1 shows the result obtained by the catalyst system formed by leaving out $CrO_2Cl_2$ from the $AlCl_3$-B.P.O.-$CrO_2Cl_2$ catalyst system.

All copolymers in Table 4 were determined to be alternate copolymers of butadiene and acrylonitrile respectively. However, the copolymers in Exp. No. 1 and 2 were all easily soluble in chloroform and acetone at room temperature. On the other hand, most of the copolymer in Reference 1 was only sparingly soluble in the usual organic solvents. Moreover, it is observed in Table 4 that by adding $CrO_2Cl_2$ to the $AlCl_3$-B.P.O. catalyst system, yield of the alternate copolymer increases.

EXAMPLE 6

Employing the usual dry air-free technique, 0.5 millimole benzoyl peroxide, 3 milliliters heptane and varying amounts of chromium (VI) oxychloride solution in heptane (1 molar solution) were put successively in a 25 milliliter glass bottle at room temperature. Thereafter, the bottle was held in a low temperature bath at $-78°$ C and 1 millimole of aluminum chloride dissolved in 3.3 milliliters acrylonitrile and 4.0 milliliters liquid butadiene were put successively in the bottle also employing the usual dry air-free technique. Then, the bottle was sealed and the contents allowed to polymerize at 35° C for 16 hours. The amount of each individual catalyst component is set forth in Table 5.

TABLE 5

| Monomers* | | | Catalysts** | | | Reaction conditions | | Copolymer*** | |
|---|---|---|---|---|---|---|---|---|---|
| AN (ml.) | BD (ml.) | Heptane (ml.) | $AlCl_3$ (mmol) | $CrO_2Cl_2$ (mmol) | B.P.O. (mmol) | Temp. (° C.) | Time (hr.) | Yield (g.) | [η] (dl./g.) |
| Exp. No.: | | | | | | | | | |
| 1 | 3.3 | 4.0 | 3 | 1 | 0.50 | 0.5 | 35 | 16 | 0.65 |
| 2 | 3.3 | 4.0 | 3 | 1 | 1.00 | 0.5 | 35 | 16 | 0.68 |
| Reference 1 | 3.3 | 4.0 | 3 | 1 | 0 | 0.5 | 35 | 16 | 0.30 |

* AN: acrylonitrile; BD: liquid butadiene.
** B.P.O.: benzoyl peroxide.
*** [η]: intrinsic viscosity in chloroform at 30° C.

Reference 1 shows the result obtained by the catalyst system formed by leaving out $CrO_2Cl_2$ from the $AlCl_3$-B.P.O.-$CrO_2Cl_2$ catalyst system.

All copolymers in Table 5 were determined to be alternate copolymers of butadiene and acrylonitrile respectively. However, the copolymers in Exp. No. 1 and 2 were all easily soluble in chloroform and acetone at room temperature. On the other hand, most of the copolymer in Reference 1 was only sparingly soluble in the usual organic solvents. Moreover, it is observed in Table 5 that by adding $CrO_2Cl_2$ to the $AlCl_3$-B.P.O. catalyst system, yield of the alternate copolymer increases.

EXAMPLE 7

Employing the usual dry air-free technique, 0.5 millimole benzoyl peroxide, 3 milliliters methylene chloride and varying amounts of chromium (VI) oxychloride solution in methylene chloride (1 molar solution) were put successively in a 25 milliliter glass bottle at room temperature. Thereafter, the bottle was held in a low temperature bath at $-78°$ C and 1 millimole of stannic chloride dissolved in 3.3 milliliters acrylonitrile and 4.0 milliliters liquid butadiene were put successively in the bottle also employing the usual dry air-free technique. Then, the bottle was sealed and the contents allowed to polymerize at 35° C for 16 hours. The amount of each individual catalyst component is set forth in Table 6.

TABLE 6

| Monomers* | | | Catalysts** | | | Reaction conditions | | Copolymer*** | |
|---|---|---|---|---|---|---|---|---|---|
| AN (ml.) | BD (ml.) | $CH_2Cl_2$ (ml.) | $SnCl_4$ (mmol) | $CrO_2Cl_2$ (mmol) | B.P.O. (mmol) | Temp. (° C.) | Time (hr.) | Yield (g.) | [η] (dl. g.) |
| Exp. No.: | | | | | | | | | |
| 1 | 3.3 | 4.0 | 3 | 1 | 0.05 | 0.5 | 35 | 16 | 1.13 |
| 2 | 3.3 | 4.0 | 3 | 1 | 0.50 | 0.5 | 35 | 16 | 0.74 |
| Reference 1 | 3.3 | 4.0 | 3 | 1 | 0 | 0.5 | 35 | 16 | 0.23 |

*AN: acrylonitrile; BD: liquid butadiene.
**B.P.O.: benzoyl peroxide.
***[η]: intrinsic viscosity in chloroform at 30° C.

Reference 1 shows the result obtained by the catalyst system formed by leaving out $CrO_2Cl_2$ from the $SnCl_4$-B.P.O.-$CrO_2Cl_2$ catalyst system. The copolymer in Reference 1 contained 45 mole percent acrylonitrile and most of the copolymer was only sparingly soluble in the usual organic solvents. However, the chloroform soluble fraction of the copolymer contained a much higher content of the butadiene-acrylonitrile repeating unit than did a random copolymer. The fraction showed a considerable amount of the $7.9\tau$ peak in the NMR spectrum but still less than found in a random copolymer. A sharp peak at $8.2\tau$, which is characteristic of the alternating unit, was also present.

The copolymers in Exp. No. 1 and 2 were all determined to be alternate copolymers of butadiene and acrylonitrile from their NMR data and the microstructures of butadiene unit in these copolymers were found to be all trans 1.4-structure from their IR data. These alternate copolymers were easily soluble in chloroform and acetone at room temperature.

From the above results it is found that by adding $CrO_2Cl_2$ to the $SnCl_4$-B.P.O. catalyst system, solubility and degree of alternation of the copolymer obtained are both increased.

EXAMPLE 8

Employing the usual dry air-free technique, 0.5 millimole benzoyl peroxide, 3 milliliters heptane and varying amounts of chromium (VI) oxychloride solution in heptane (1 molar solution) were put successively in a 25 milliliter glass bottle at room temperature. Thereafter, the bottle was held in a low temperature bath at $-78°$ C and 1 millimole of stannic chloride dissolved in 3.3 milliliters acrylonitrile and 4.0 milliliters liquid butadiene were put successively in the bottle also employing the usual dry air-free technique. Then, the bottle was sealed and the contents allowed to polymerize at 35° C for 16 hours. The amount of each individual catalyst component is set forth in Table 7

TABLE 7

| Monomers* | | Heptane (ml.) | Catalysts** | | | Reaction conditions | | Copolymer*** | |
|---|---|---|---|---|---|---|---|---|---|
| AN (ml.) | BD (ml.) | | SnCl₄ (mmol) | CrO₂Cl₂ (mmol) | B.P.O. (mmol) | Temp. (°C.) | Time (hr.) | Yield (g.) | [η] (dl./g.) |
| Exp. No.: | | | | | | | | | |
| 1 | 3.3 | 4.0 | 3 | 1 | 0.50 | 0.5 | 35 | 16 | 1.29 |
| 2 | 3.3 | 4.0 | 3 | 1 | 1.00 | 0.5 | 35 | 16 | 1.80 |
| Reference 1 | 3.3 | 4.0 | 3 | 1 | 0 | 0.5 | 35 | 16 | 0.20 |

*AN: acrylonitrile; BD: liquid butadiene.
**B.P.O.: benzoyl peroxide.
***[η]: intrinsic viscosity in chloroform at 30° C.

Reference 1 shows the result obtained by the catalyst system formed by leaving out $CrO_2Cl_2$ from the $SnCl_4$-B.P.O.-$CrO_2Cl_2$ catalyst system. The copolymer in Reference 1 contained 45 mole percent acrylonitrile and most of the copolymer was only sparingly soluble in the usual organic solvents. However, the chloroform soluble fraction of the copolymer contained a much higher content of the butadiene-acrylonitrile repeating unit than did a random copolymer. The fraction showed a considerable amount of the 7.9τ peak in the NMR spectrum but still less than found in a random copolymer. A sharp peak at 8.2τ, which is characteristic of the alternating unit, was also present.

The copolymers in Exp. No. 1 and 2 were all determined to be alternate copolymers of butadiene and acrylonitrile from their NMR data and the microstructures of butadiene unit in these copolymers were found to be all trans 1.4-structure from their IR data. These alternate copolymers were easily soluble chloroform and acetone at room temperature.

From above results it is found that by adding $CrO_2Cl_2$ to the $SnCl_4$-B.P.O. catalyst system, solubility and degree of alternation of the copolymer obtained are both increased.

EXAMPLE 9

Employing the usual dry air-free technique, 2 milliliters methylene chloride, 1.7 milliliters acrylonitrile, 1 millimole aluminum chloride, 0.5 millimole benzoyl peroxide, varying amounts of triethoxy vanadium oxide $(OV(OC_2H_5)_3)$ solution in toluene (1 molar solution) and 2.0 milliliters liquid butadiene were put successively in a 25 milliliter glass bottle at −78° C. Then, the bottle was sealed and the contents allowed to polymerize at 20° C for 16 hours. The amount of each individual catalyst component is set forth in Table 8.

TABLE 8

| Monomers* | | | Catalysts** | | | Reaction conditions | | Copolymer*** | |
|---|---|---|---|---|---|---|---|---|---|
| AN (ml.) | BD (ml.) | CH₂Cl₂ (ml.) | AlCl₃ (mmol) | OV(OC₂H₅)₃ (mmol) | B.P.O. (mmol) | Temp. (°C.) | Time (hr.) | Yield (g.) | [η] (dl./g.) |
| Exp. No.: | | | | | | | | | |
| 1 | 1.7 | 2.0 | 2 | 1 | 0.01 | 0.5 | 20 | 16 | 0.21 | 1.19 |
| 2 | 1.7 | 2.0 | 2 | 1 | 0.03 | 0.5 | 20 | 16 | 0.31 | 0.96 |
| 3 | 1.7 | 2.0 | 2 | 1 | 0.10 | 0.5 | 20 | 16 | 0.27 | 0.66 |

*AN: acrylonitrile; BD: butadiene.
**B.P.O.: benzoyl peroxide.
***[η]: intrinsic viscosity in chloroform at 30° C.

The copolymers in Exp. No. 1–3 were all found to be a chloroform soluble alternate copolymer of butadiene and acrylonitrile respectively.

EXAMPLE 10

Employing the usual dry air-free technique, 0.02 millimole triacetylacetonylvanadium $((C_5H_7O_2)_3V)$ and 2 milliliters methylene chloride were put successively in a 25 milliliter glass bottle at room temperature. Thereafter, the bottle was held in a low temperature bath at −78° C and 1 millimole of aluminum chloride dissolved in 1.7 milliliters acrylonitrile, 0.5 millimole benzoyl peroxide and 2.0 milliliters liquid butadiene were put successively in the bottle also employing the usual dry air-free technique. Then, the bottle was sealed and allowed to polymerize at 35° C for 16 hours. 0.64g acetone and chloroform soluble alternate copolymer of butadiene and acrylonitrile was obtained. Its intrinsic viscosity was found to be 0.62 (dl/g) in chloroform at 30° C.

EXAMPLE 11

Employing the usual dry air-free technique, 0.5 millimole triacetylacetonylvanadium $((C_5H_7O_2)_3V)$ and 2 milliliters methylene chloride were put successively in a 25 milliliter glass bottle at room temperature. Thereafter, the bottle was held in a low temperature bath at −78° C and 1 milliliter stannic chloride solution in methylene chloride (1 molar solution), 1.7 milliliters acrylonitrile, 0.5 millimole benzoyl peroxide and 2.0 milliliters liquid butadiene were put successively in the bottle also employing the usual dry air-free technique. Then the bottle was sealed and allowed to polymerize at 35° C for 16 hours. 0.27g acetone and chloroform soluble alternate copolymer of butadiene and acrylonitrile was obtained. Its intrinsic viscosity was found to be 0.22 (dl/g) in chloroform at 30° C.

EXAMPLE 12

Employing the usual dry air-free technique, 2.0 millimoles triacetylacetonylvanadium $((C_5H_7O_2)_3V)$ and 2 milliliters methylene chloride were put successively in a 25 milliliter glass bottle at room temperature. Thereafter, the bottle was held in a low temperature bath at −78° C and 12.5 millimoles zinc chloride, 1.7 milliliters acrylonitrile, 0.5 millimole benzoyl peroxide and 2.0 milliliters liquid butadiene were put successively in the bottle also employing the usual dry air-free technique. Then the bottle was sealed and the monomers therein were allowed to polymerize at 35° C for 2 hours. 0.40g acetone and chloroform soluble alternate copolymer of butadiene and acrylonitrile was obtained. Its intrinsic viscosity was found to be 0.68 (dl/g) in chloroform at 30° C.

EXAMPLE 13

Employing the usual dry air-free technique, 0.05 millimole of diacetylacetonylvanadium oxide vanadiaum oxide $(OV(C_5H_7O_2)_2)$ and 2 milliliters methylene chloride were put successively in 25 milliliters glass bottle at room temperature. Thereafter the bottle was held in a low temperature bath at −78° C and 1 milliliter stannic chloride solution in methylene chloride (1 molar solution), 1.7 milliliters acrylonitrile, 0.5 millimole benzoyl peroxide and 2.0 milliliters liquid butadiene were put successively in the bottle also employing the usual dry air-free technique. Then the bottle was sealed and the monomers therein were allowed to polymerize at 25° C for 7 hours. 0.13g acetone and chloroform soluble alternate copolymer of butadiene and acrylonitrile was obtained. Its intrinsic viscosity was found to be 0.32 (dl/g) in chloroform at 30° C.

What is claimed is:

1. A process for preparing an alternate copolymer of butadiene and acrylonitrile by contacting acrylonitrile and butadiene successively in a non-aqueous liquid phase in the presence of the catalyst system comprising a metal chloride selected from the group consisting of aluminum chloride, stannic chloride and zinc chloride as a first component, a compound selected from the group consisting of a vanadium compound having the general formula $OVCl_{3-n}(OR)_n$ wherein $n$ is a number from 0 to 3 and R is selected from the group consisting of alkyl, aryl and cycloalkyl groups, a vanadium complex selected from the group consisting of bis(cyclopentadienyl) vanadium, bis(cyclopentadienyl) vanadium chloride, bis(cyclopentadienyl) vanadium dichloride, cyclopentadienyl vanadium trichloride, cyclopentadienyl vanadium dichloride oxide, tetracarbonyl cyclopentadienyl vanadium, acetylacetonyl vanadium dichloride oxide, triacetylacetonyl vanadium oxide, diacetylacetonyl vanadium chloride oxide, diacetylacetonyl vanadium oxide, triacetylacetonyl vanadium and chromium (VI) oxychloride as a second component, and an organic peroxide selected from the group consisting of an alkyl peroxide, an acyl peroxide and a hydroperoxide as a third component.

2. A process of claim 1, wherein the vanadium compound is $VOCl_3$.

3. A process of claim 1 wherein the vanadium compound is selected from the group consisting of acetyl acetonyl vanadium dichloride oxide, diacetyl acetonyl vanadium oxide, diacetyl acetonyl vanadium chloride oxide, diacetyl acetonyl vanadium oxide and triacetyl acetonyl vanadium.

4. A process of claim 1, wherein the chromium compound is $CrO_2Cl_2$.

5. A process of claim 1, wherein the copolymerization reaction is carried out in the presence of a diluent selected from the group consisting of hydrocarbons, chlorinated hydrocarbons and a mixture thereof.

6. A process of claim 1, wherein the molar ratio of butadiene to acrylonitrile in the initial monomer composition is within the range from 20 :80 to 80 : 20.

7. A process of claim 1, wherein the polymerization temperature is within the range of from about −70° C. to about +60° C.

8. A process of claim 3, wherein the copolymerization temperature is from about −70° C. to +40° C.

9. A process of claim 8, wherein the molar ratio of butadiene to acrylonitrile in the initial monomer composition is about 50:50.

10. A process for preparing an alternate copolymer of butadiene and acrylonitrile by contacting first acrylonitrile and then butadiene in a non-aqueous liquid medium in the presence of a catalyst comprising a metal chloride selected from the group consisting of aluminum chloride and zinc chloride as one component, and an organic peroxide selected from the $OVCl_{3-n}(OR)_n$ wherein $n$ is a number 0 to 3 and R is selected from the group consisting of alkyl, aryl and cycloalkyl groups as a second component, and an organic peroxide selected from the group consisting of an alkyl peroxide, an acyl peroxide and a hydroperoxide as a third component.

* * * * *